United States Patent [19]

Iwagaya

[11] Patent Number: 4,965,737
[45] Date of Patent: Oct. 23, 1990

[54] NUMERICAL CONTROL APPARATUS PROVIDING HIGH-SPEED DISTRIBUTION DATA

[75] Inventor: Takashi Iwagaya, Hachioji, Japan

[73] Assignee: Fanuc Ltd, Minamitsuru, Japan

[21] Appl. No.: 167,851

[22] PCT Filed: Jul. 25, 1987

[86] PCT No.: PCT/JP87/00545

§ 371 Date: Jan. 29, 1988

§ 102(e) Date: Jan. 29, 1988

[87] PCT Pub. No.: WO88/01072

PCT Pub. Date: Feb. 11, 1988

[30] Foreign Application Priority Data

Jul. 26, 1986 [JP] Japan .................................. 61-175866

[51] Int. Cl.⁵ ........................................ G05B 19/403
[52] U.S. Cl. ................... 364/474.22; 364/191; 364/474.23; 364/474.3; 318/568.1; 82/118
[58] Field of Search .................. 364/474.02, 474.23, 364/474.26, 474.3, 191-193, 474.22; 318/568, 39, 571, 568.1; 82/118

[56] References Cited

U.S. PATENT DOCUMENTS

| | | | |
|---|---|---|---|
| 4,078,195 | 3/1978 | Mathias et al. | 364/474.15 X |
| 4,145,740 | 3/1979 | McClean et al. | 364/469 |
| 4,250,551 | 2/1981 | Paveglio, Jr. et al. | 364/474.23 |
| 4,446,525 | 5/1984 | Hoch et al. | 364/474.23 |
| 4,484,286 | 11/1984 | Nagamine et al. | 364/474.23 |
| 4,653,360 | 3/1987 | Compton | 364/474.02 X |
| 4,723,219 | 2/1988 | Beyer et al. | 364/474.2 X |
| 4,725,960 | 2/1988 | Shima et al. | 364/474.26 |

FOREIGN PATENT DOCUMENTS

| | | |
|---|---|---|
| 79388 | 5/1983 | European Pat. Off. . |
| 52-32480 | 3/1977 | Japan . |
| 55-37250 | 3/1980 | Japan . |

OTHER PUBLICATIONS

Supplementary European Search Report for EP-87-9-0-4942, The Hague, 2/16/90.

Primary Examiner—Joseph Ruggiero
Attorney, Agent, or Firm—Staas & Halsey

[57] ABSTRACT

Execution format data required by a specific C-axis machining function such as a lead machining function are prepared by a custom macro, which has been stored in a ROM (102), based on data set by an operator through use of setting means such as a keyboard (104), and high-speed distribution data for controlling the machine tool are provided whenever necessary by setting parameters similar to those in ordinary milling. This makes it possible to realize a specific machining function which requires high-speed interpolation for machine movement command data.

5 Claims, 4 Drawing Sheets

```
O1000:
  G10 P1 Xx1 Zz1 Rr1 Qq:
  G10 P2 Xx2 Zz2:
  G10 P3 Xx3 Zz3:
  .
  .
  G10 Pn Xxn Zzn:

G65 H01 P#500 Qmax:

M98 P9011:

G10 P1 Rr2:
  M98 P9012:
M30:
```

```
O1:
  .
  .
  G07 Pp Kn:
  .
  .
  G07 Pp Kn:
  .
  M30:
```

NUMERICAL CONTROL APPARATUS PROVIDING HIGH-SPEED DISTRIBUTION DATA

BACKGROUND OF THE INVENTION

This invention relates to a numerical control apparatus for an NC machine tool which performs C-axis machining.

A numerical control apparatus ordinarily is adapted to execute numerical control processing based on NC program data, and to control an NC machine tool such as a lathe in accordance with the results of processing to subject a workpiece to machining specified by a command. Recent numerical control apparatus come equipped with subprogram and custom macro functions through which various complicated machining control programs and repetitive control programs can be prepared in a simple manner.

The aforementioned custom macro is utilized in order to comply with a user request that the NC machine tool be provided with the function of a lead processing machine in a case where C-axis machining is to be performed. However, this makes it necessary that the machining command data be supplied to each axis at a rate greater than the conventional distribution frequency. In other words, a lead machining function refers to a machining function in which, in an NC machine tool having a mechanical construction of the kind shown in FIG. 7, a tool t on a Z axis parallel to the rotational axis C of a workpiece w is moved at high speed along the Y axis by a move command independent of the Z axis to subject the workpiece w to milling. Such a lead machining function is essential in the machining of e.g. the head of a video deck, which requires that the workpiece w be rotated and that the movement of the tool be controlled in such a manner that the amount of machining differs every rotational angle during one revolution of the workpiece. In a machine tool for practicing this lead machining, it is also necessary to deal not only with lead machining but also with ordinary milling by the tool t in accordance with the drive axes X, Z of the tool t. With the conventional numerical control apparatus, the preparation of the amount of high-speed distribution data necessary for lead machining and the editing of programs cannot be performed in a simple manner, and special-purpose machinery is required for this type of machining.

SUMMARY OF THE INVENTION

The present invention has been devised to solve the aforementioned problems and its object is to provide a numerical control apparatus through which high-speed distribution data for controlling a machine tool having the foregoing mechanical construction can be prepared with facility by a user whenever necessary.

In accordance with the present invention, there is provided a numerical control apparatus for controlling a machine tool having a machining function for moving a tool relative to a workpiece or vice versa along a rotational axis of the workpiece to machine the workpiece to a predetermined shape, comprising data setting means for setting a relation between a rotational angle of the workpiece and a position of the tool relative to the workpiece, processing means for deciding an amount of tool movement and a rotational velocity of the workpiece in accordance with the set data, and drive control means for distributing decided move command data to the machine tool.

Thus, in the numerical control apparatus of the invention, data in an execution format required by a specific machining function such as a lead machining function are prepared based on data set by an operator, and high-speed distribution data for controlling the machine tool are readily prepared by a user whenever necessary by setting parameters similar to those in ordinary milling. Thus, a specific machining function which requires high-speed interpolation is realized.

DESCRIPTION OF THE PREFERRED EMBODIMENT

An embodiment of the present invention will now be described in detail with reference to the drawings.

Figure 1:
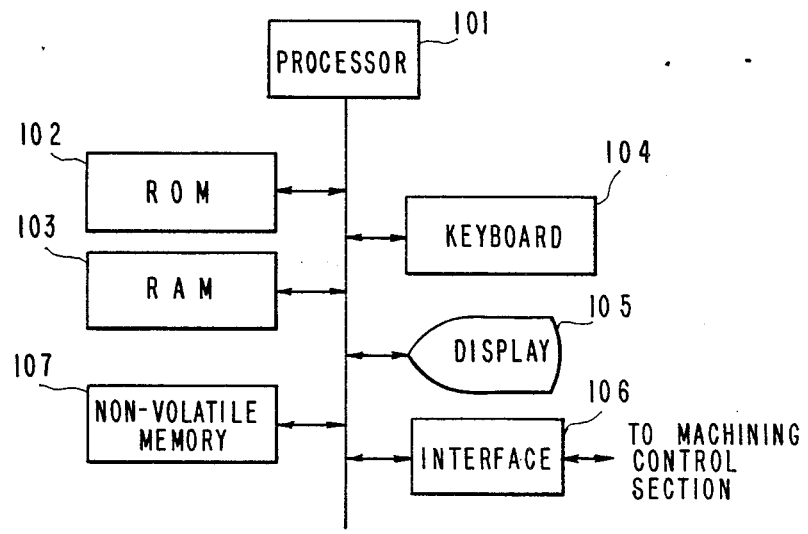
FIG. 1 is a block diagram illustrating an embodiment of the present invention.

FIG. 1 is a block diagram illustrating an example of a processing section for executing the programming function processing of the numerical control apparatus of the present invention. In FIG. 1, numeral 101 denotes processing means, e.g. a microprocessor, which executes processing such as for preparing a machining program. Connected to the processor 101 are a ROM 102 for storing a data preparation custom macro or a display data editing control program described below; a reloadable memory (RAM) 103 for storing a prepared machining program; data setting means, e.g. a keyboard 104, for inputting data; a graphic display unit 105 for displaying a program prepared based on data inputted from the keyboard 104 as well as a machining path based on the program; and an input/output interface 106 for administering an exchange of data with a machining control section. The processor 101 also has a non-volatile memory 107 for storing system parameters and files for automatic programming, as well as NC parameters. The machining control section connected to the input/output interface 106 controls a machine tool having a machining function for moving a tool relative to a workpiece or the workpiece relative to the tool along the rotational axis of the workpiece to machine the workpiece to a predetermined shape.

Figure 2:
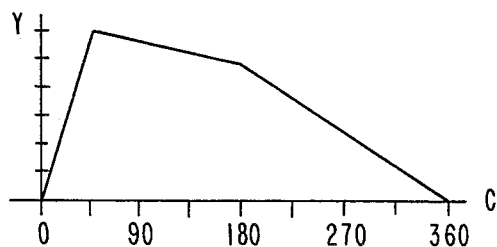
FIG. 2 is a displacement diagram illustrating an example of lead machining.
Figure 7:
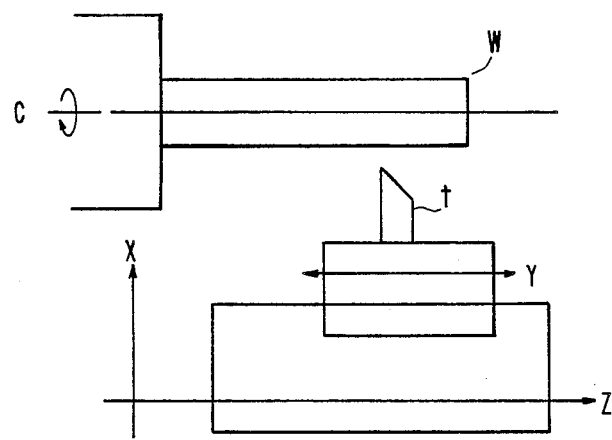
FIG. 7 illustrates the mechanical construction of a lead processing machine.

FIG. 2 illustrates an example of execution format data necessary for controlling the drive of the machine tool, based on set data inputted by the keyboard 104, in order that lead machining may be performed. The execution format data referred to here are distribution data having a period of 2 msec created by the custom macro stored in the ROM 102. When an amount of displacement along the Y axis during one revolution about the C axis is inputted from the keyboard 104 in order to control drive along the C and Y axes shown in FIG. 7, the execution format data are outputted to the machining control section from the interface 106.

The amount of distribution along the C axis in 2 msec is decided by the rotational speed of the workpiece. If the number of broken lines of the displacement curve of FIG. 2 is limited to within 30, it will be possible in theory to achieve a maximum rotational speed of about 850 rpm about the C axis.

Figures 3A, 3B, 4A, 4B:
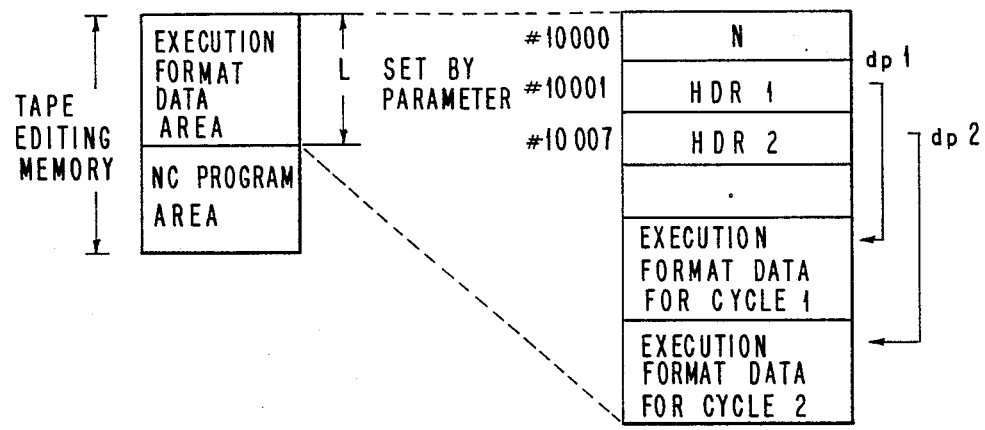
FIGS. 3(a) and 3(b) illustrate the constitution of an area storing execution format data.
FIGS. 4(a) and 4(b) illustrate the arrangement of a header.

FIGS. 3(a) and 3(b) illustrate the constitution of an area for storing execution format data. The execution format data area is secured together with an NC program area in a tape editing memory of the RAM 103 or the like and comprises three types of data as described hereinbelow.

N represents the number of cycles of the execution format data and indicates a number, stored as execution format data, which is a total of a cycle 1 for executing ordinary milling by controlling the X and Z axes simultaneously, and a cycle 2 for lead machining. The number of cycles corresponds to the number of headers HDR1, HDR2, ... which manage and define the data of each cycle.

A header HDR is comprises six items of information. Specifically, as shown in FIGS. 4(a), (b), a number of a set items of data per one revolution of the workpiece is written at a first address, the type of data is written at a second address, data for a first axis are written at a third address, and data for a second axis are written at a fourth address. The number n of the set items of data is decided by the rotational speed s of the workpiece such that n=30000/s holds. However, since the amount of distribution every 2 msec along the C axis is a divisor of 36000, some discrepancy will occur. The type of data is arranged as shown in FIG. 4(b). That is, a0 or a1, designating the C-axis data type, is written at the location of the 0 bit and a0 or a1 designating the Y-axis data type, is written at the location of the 1 bit, respectively. A "0" means that the distribution data are fixed at all times, and a "1" means that the distribution data are designated in units of 2 msec in the next execution format data area. Ordinarily, fixed distribution data $\delta$C or a starting data number dp1 indicating a variable distribution data storage region is designated depending upon the data for the first axis. In the case of lead machining, the first axis is the C axis, so that $\delta$C is set. Similarly, what is designated depending upon the data for the second axis is a starting data number dp2 indicating a variable distribution data storage area.

The execution format data are stored upon being divided into data for cycle 1 and data for cycle 2. In the case of lead machining, the format data are selected from the area for cycle 2 by the data number dP2 designated by the header HDR(e.g., FIG. 4(a). The execution format data are stored in advance by an execution format data preparation program described below and are computed as 2 msec distribution data on the basis of input data relating to the displacement curve shown in FIG. 2. Ordinarily, the command unit along the C axis is 0.01 deg, and the command unit along the Y axis is 0.01 mm or 0.001 inch.

A method of accessing the aforementioned execution format data area will now be described.

Figures 5, 6A, 6B:
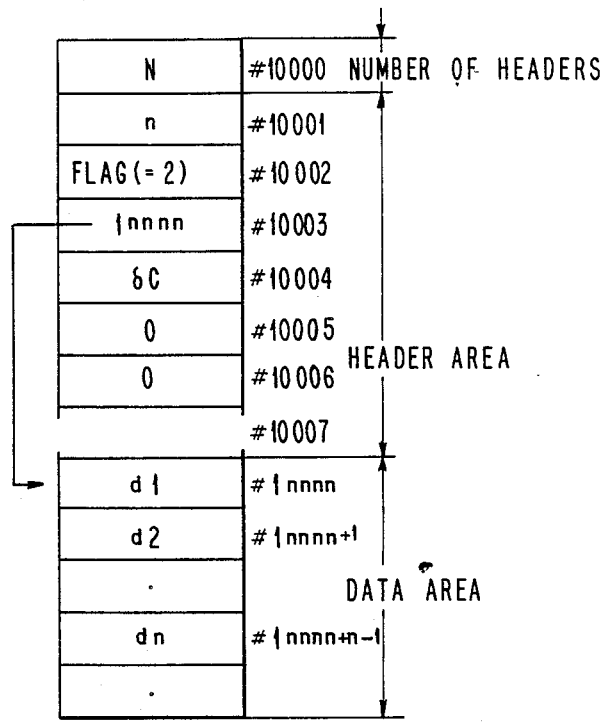
FIG. 5 illustrates the correspondence between variables and the area storing the execution format data.
FIGS. 6(a) and 6(b) illustrate examples of a program for preparing execution format data and an execution program, respectively.

The execution format data can be read and written in response to a custom macro instruction inserted in an ordinary program. Indirect accessing is possible by setting actual values in the variables of the custom macro instruction. Accordingly, execution format data may also be referred to as execution format variables and are stored at 10,000 addresses from #10000 to #19999. An example of an execution format data area is shown in FIG. 5. The correspondence with variable numbers is shown in Table 1, and the correspondence with distribution data in the data area is shown in Table 2.

TABLE 1

| Item | Correspondence with Variable Numbers |
| --- | --- |
| Number of Headers | #10000 |
| Header | #10001 ~#10001 + (N − 1)*6 + 5 |
| Data Portion | #10001 + (N − 1)*6 + 6~ |

TABLE 2

| Number of Distributions | 1st Axis C | 2nd Axis Y |
| --- | --- | --- |
| 1st | $\delta$C | d1 |
| 2nd | $\delta$C | d2 |
| . | . | . |
| . | . | . |
| nth | $\delta$C | dn |

An example of a program for preparing the foregoing format data will now be described with reference to FIG. 6(a).

The preparation program 01000 executes the registration of the machining shape, which is indicated by the displacement curve for the C and Y axes, n times by means of a G code G10 in the data input. By using a function for registering the amount of tool offset, this enables the shape to be set while it is being called to the display unit 105. Here x1-xn and z1-zn are the angle of rotation about the C axis and the amount of movement along the Z axis, respectively, and r1 is the rotational speed necessary for machining. Further, q designates 1 in case of an absolute command and 2 in case of an incremental command, namely depending upon the method of commanding the angle of rotation and displacement. Also, P is a point number, and n≦30.

The next line, which starts at G65, sets the maximum value of the execution format variable to a common variable. By successively calling subprograms P9011, P9012, described below, format execution data of cycle 1 and cycle 2 can be prepared from the machining shape. The rotational speed is changed from r1 to r2 at this time after the execution format data of cycle 1 are prepared.

The execution format data thus prepared and stored can be called within a machining cycle by an execution program of the kind shown in FIG. 6(b), thus allowing lead machining to be carried out. The preparatory code G07 is a one-shot read machining call instruction, in which the type of cycle to be called is designated by p and the number of times lead machining is to be repeated is designated by n. If the execution format data have not yet been registered, a PS alarm is issued.

Though an embodiment of the present invention has been described, the invention is not limited thereto but can be modified in various ways without departing from the scope of the claims.

The numerical control apparatus of the present invention finds applicability in controlling a machine tool by inputting data relating to a change in the relative position of a tool during one revolution of a workpiece, deciding the amount of tool movement and the rotational speed of the workpiece, and outputting machine movement command data as high-speed distribution data on the basis of an instruction for executing lead machining commanded whenever necessary.

EXAMPLE OF PROGRAM FOR PREPARING EXECUTION FORMAT DATA (1) 09011
%
:9011
```
┌─G65H82P3000#2301R2
│ G65H01P#100Q2001
│ G65H01P#101Q2002 ─────────────────────────────────┐
│ G65H01P#102Q2101      If formation data are incremental command values,
│ G65H01P#103Q2102      convert to absolute values
├─N100G65H02P#9101Q#9100R#9101
│ G65H02P#9103Q#9102R9103
│ G65H02P#100Q#100R1
│
│ G65H02P#101Q#101R1
│ G65H02P#102Q#102R1
│ G65H02P#103Q#103R1
├─G65H86P200Q#101R2030
│ G65H99P-404─┐  Number of source data items exceeded
│ G65H80P900 ─┘           PS 96
├─N200G65H03P#121Q#101R1
├─G65H82P-100Q#9121R36000─────────────────────────
└─N300G65H01P#100Q2000
  N400G65H02P#100Q#100R1
┌─G65H86P500Q#100R2030
│ G65H99P-404─┐  Final value of source data along C axis
│ G65H80P900 ─┘  not 360°     PS 96
└─N500G65H82P-400Q#9100R36000
  G65H03P#104Q#100R2000 — #104 Number of data
  G65H05P#105Q30000R#2201 — #105 Number of distributions (2 msec) per revolution
  G65H03P#105Q#105R1
┌─N600G65H02P#105Q#105R1──── Revise #105 such that number of divisions
│ G65H23P#121Q36000R#105      becomes divisor of 360°
└─G65H82P-600Q#121R0
  G65H05P#106Q36000R105 — Find rotational angle (0.01° units) per one distribution in #106
  G65H01P#107Q10020 — Head of execution format data
  G65H02P#121Q#105R#107─┐
  G65H03P#121Q#121R     ├─Find end of execution format data and check if storable
  G65H86P700Q121R#500 ──┘
  G65H99P-403─┐            #500 is main program; set
  G65H80P900 ─┘ Number of execution items     value
                exceeded ─┐
                          PS97
  N700G65H01P#109Q10000─┐
  G65H01P#9109Q0 ───────┘─Clear number of cycles to 0 (#10000=0)
  G65H01P#108Q1─┐
  M98P9111──────┘─Prepare header portion of cycle 1
  G65H01P#110Q0─┐
  G65H01P#111Q0 │
  G65H01P#112Q0 ├─Compute distribution data every 2 msec from Y-C diagram,
  G65H01P#100Q2001 │ and set in data area
  N98P9110 ─────┘
  G65H01P#100Q10000─┐
  G65H01P#91001Q ───┘─Set cycle number count to 1
  N900M99
```
(2) 09012
:9012
G65H05P#105Q30000R#2201 #105 Find number of divisions per revolution
```
G65H03P#105Q#105R1─────┐
N100G65H02P#105Q#105R1 │  Revise such that number of divisions
G65H23P#121Q36000R#105 ├─ becomes divisor of 360°
G65H82P-100Q121R0──────┘
```
G65H05P#106Q36000R105  Find rotational angle per one distribution in #106
```
G65H01P#100Q10001─────┐  Storage starting address for
G65H01P#107Q10004     ├─ execution format data of cycle 2
G65H02P#107Q#9107R#9100┘

G65H02P#121Q#107R#105─┐
G65H03P#121Q#121R     ├─Find end of execution format data and check if storable
G65H86P200Q#121R#500 ─┘

G65H99P-403─┐
G65H80P900 ─┘─Execution format data overflow
                                PS97
N200G65H01P#108Q2─┐
M98P9111 ─────────┘─Form header of cycle 2
```

-continued

```
G65H01P#110Q0─┐
G65H01P#111Q0  │
G65H01P#112Q0  ├─ Compute distribution data every 2 msec from
G65H01P#100Q2001│   Y-C diagram, and set in data area
M98P9110      ─┘
G65H01P#100Q10000─┐
G65H01P#9100Q2   ─┴─ Set cycle number count to 2
N900M99
(3) O9110
:9100
N200G65H02P#110Q#110R#106-#110 Accumulated value of amount of C-axis distribution
N300G65H86P400Q#110R#91006 — Go to processing of N400 if less than inflection point
G65H02P#100Q#100R1 ─┐
G65H80P300         ─┴─ Add source data index
N400G65H02P#102Q#100R100 — Find C-axis source data index
G65H01P#117Q0       ─┐
G65H01P#118Q0        │
G65H01P500Q#100R2001 ├─ Find values of Y,C of preceding inflection point.
G65H03P#121Q#100R1   │   If initial values, adopt Y,C = 0
G65H01P#117Q#9121    │
G65H03P#121Q#902R1   │
G65H01P#118Q#9121   ─┘
N500G65H03P#121Q9102R#118 -#121 Amount of Y-axis displacement of one broken line
G65H03P#122Q#9100R#117-#122 Amount of C-axis displacement of one broken line
G65H03P#123Q#110R#117-#123 Present amount of C-axis displacement (absolute)
G65H26P#121Q#123R#122-#122 Find Y-axis displacement (absolute)
G65H02P#114Q#121R#118
G65H03P#9107Q#114R#111 — Find ΔY and store in execution data area
G65H01P#111Q#114 — Save present point at preceding point (#111)
G65H02P#107Q#107R1 — Next storage area
G65H02P#112Q#112R1 ─┐
G65H82P-200Q#112Q#115 ─┴─ Repeat by number of distributions
N900M99
(3) O9111
:9111
G65H01P#109Q10000-#109 Set beginning of execution format variable
G65H03P#108Q#108R1 ─┐
G65H04P#108Q#108R6  ├─ Find beginning position of header from cycle number (#108)
G65H02P#109Q#109R#108│   #109=#109+(108-1)*6+1
G65H02P#109Q#109R1 ─┘
G65H01P#9109Q#105 — Set number of distribution data
G65H02P#109Q#109R1
G65H01P#9109Q2 — Set flag 2
G65H02P#109Q#109R1
G65H01P#9109Q#106 — Set amount of C-axis distribution (fixed)
G65H02P#109Q#109R1
G65H01P#9109Q#107 — Storage starting address for Y-axis distribution data
G65H02P#109Q#109R1 ─┐
G65H01P#9109Q0      ├─ Clear remaining header areas
G65H02P#109Q#109R1  │
G65H01P#9109Q0     ─┘
M99
%
```

I claim:

1. A numerical control apparatus for controlling a machine tool having a machining function for movement of a tool relative to a workpiece along a rotational axis of the workpiece to machine the workpiece to a predetermined shape, comprising:
   data setting means for setting a relation between a rotational angle of the workpiece and a position of the tool relative to the workpiece;
   processing means for deciding an amount of tool movement and a rotational velocity of the workpiece in accordance with the relation; and
   drive control means for distributing at high-speed decided move command data to said machine tool.

2. A numerical control apparatus according to claim 1, further comprising graphic display means for displaying a program prepared on the basis of data inputted from said data setting means, and a machining path based on the program.

3. A numerical control apparatus according to claim 1, wherein said processing means includes:
   means for calling a custom macro program in which the set relation between the rotational angle of the workpiece and the position of the tool relative to the workpiece serves as a parameter;
   means for preparing, in accordance with said macro program, execution format data for deciding the amount of tool movement and the rotational velocity of the workpiece; and
   means for determining move command data necessary for a lead machining function.

4. A numerical control apparatus according to claim 1, further comprising:
   means for preparing execution format data for deciding the amount of tool movement and the rotational velocity of the workpiece;
   means for indirectly accessing the execution format data by setting a value of a variable in a custom macro instruction inserted in a machining program.

5. A numerical control apparatus according to claim 1, wherein said drive control means distributes the decided move command data based on the rotational velocity of said machine tool.

* * * * *